Oct. 3, 1939.   T. H. NYE   2,175,158
HONE
Filed June 29, 1938
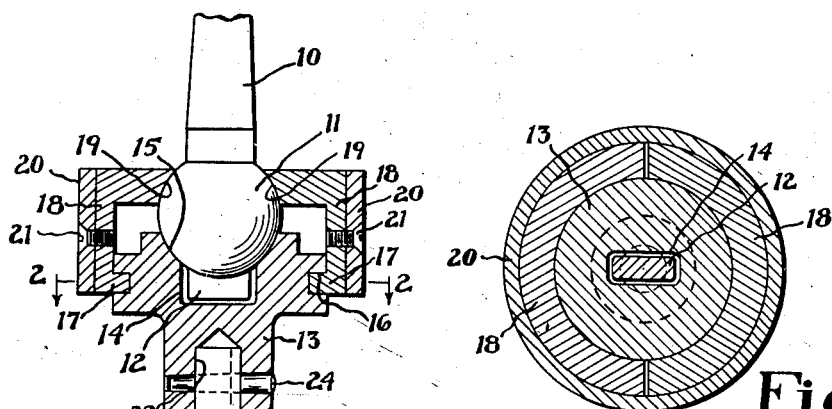
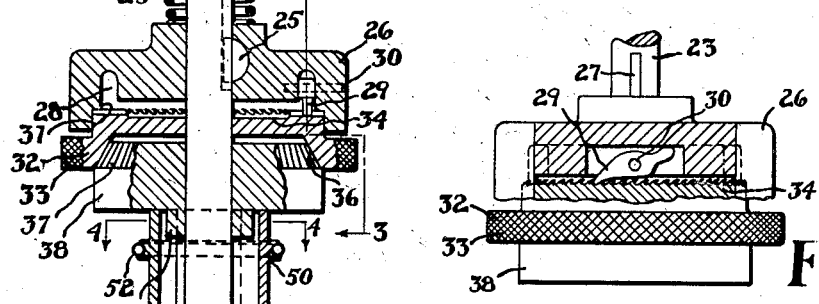
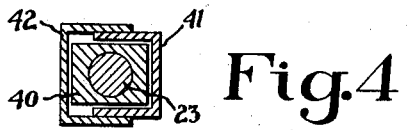
Fig.3
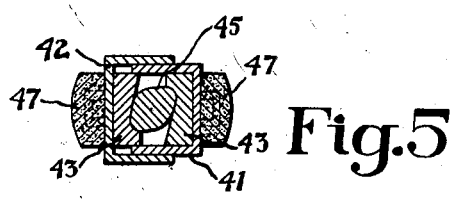
Fig.4
Fig.5
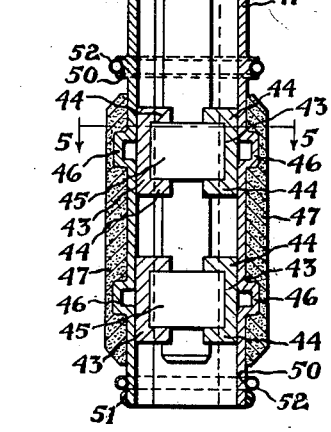
Fig.1
Inventor
THEODORE H. NYE
By George Compton Jr.
Attorney Patented Oct. 3, 1939

2,175,158

UNITED STATES PATENT OFFICE 2,175,158

HONE

Theodore H. Nye, Worcester, Mass., assignor to Norton Company, Worcester, Mass., a corporation of Massachusetts Application June 29, 1938, Serial No. 216,501

6 Claims. (Cl. 51—184.4)

The invention relates to hones for honing or lapping bores.

One object of the invention is to provide a hone construction susceptible of embodiment in a small unit for the honing or lapping of small sized bores, for example bores having a diameter of an inch and a half and less. Another object of the invention is to provide a honing tool of simple construction. Another object of the invention is to provide a readily assembled hone. Another object of the invention is to provide a hone of one or more of the above indicated characteristics which is readily adjustable. Other objects will be in part obvious or in part pointed out hereinafter.

The invention accordingly consists in the features of construction, combinations of elements, and arrangements of parts, all as will be illustratively described herein, and the scope of the application of which will be indicated in the following claims.

In the accompanying drawing showing one of many possible embodiments of the mechanical features of this invention, Figure 1 is a vertical axial sectional view of a hone constructed in accordance with the invention;

Figure 2 is a transverse sectional view taken on the line 2—2 of Figure 1;

Figure 3 is a view partly in elevation and partly in section along the line 3—3 of Figure 1;

Figure 4 is a transverse sectional view taken on the line 4—4 of Figure 1;

Figure 5 is a transverse sectional view taken on the line 5—5 of Figure 1.

Referring to Figure 1, I provide a shank 10 which may be shaped as desired to fit in the stock of an electric hand drill or in the spindle of a machine tool drill or honing apparatus if desired. On the lower end of the shank 10 is a spherical portion 11 and a driving tongue 12. I provide a driven member 13 having a groove 14 which is of about the same contour as the tongue 12 but slightly larger, as shown in Figure 2. The driven member 13 has a partial spherical surface 15 against which the spherical portion 11 fits. The driven member 13 has a groove 16 which receives the annular tongues 17 of a pair of rings 18 having partial spherical surfaces 19 also fitting the spherical portion 11. The rings 18 are held together by a collar 20 and screws 21 fitting in countersunk portions of the collar 20 and extending through to the respective rings 18. The aforesaid construction comprises a universal joint drive from the shank 10 to the member 13.

Still referring to Figure 1, in the driving member 13 is a bore 22 receiving a shaft 23 which is pinned to the driving member 13 by a pin 24. Mounted on the shaft 23 and keyed to it by means of a key 25 is a collar 26. The key 25 fits in a long spline 27 in the shaft 23. In the collar 26 is a groove 28 in which is located one or more pawls 29 shown in Figure 3 as well as in Figure 1. Pawl 29 is pivotally mounted on a pin 30 extending into the collar 26 and through the groove 28. Just below the collar 26 and received within the cup shaped opening 31 therein is an adjustment ring 32 which has a knurled peripheral portion 33 and a ratchet crown 34 which the pawl 29 engages. On the under side of adjustment ring 33 are serrated clutch teeth 36 formed in a cone and meshing with corresponding serrated clutch teeth 37 formed on an exterior cone of a driving member 38 which has a central bore fitting the shaft 23 and is rotatably mounted thereon. Considering Figures 1 and 4, on the under side of the driving member 38 is a rectangular driving lug 40 loosely fitting inside of a pair of hone carriers 41 and 42, that is to say inside of the hone carrier 41. These hone carriers 41 and 42 are long in the direction of the axis of the tool, and in cross section, as shown in Figures 4 and 5, are hollow rectangles with one side missing. That is to say, they are generally U shaped. In order that they may be strong enough to meet the forces involved, they should preferably be made of steel and may be made by stamping sheet steel.

Soldered or otherwise fastened to the inside of the carriers 41 and 42 are four tappets 43 having overlapping tops and bottom portions 44. Seated between pairs of tappets 43 are cams 45 formed on the shaft 23. Relative motion between the carriers 41 and 42 and the cams 45 spreads the carriers 41 and 42. As shown in Figure 1, the metal of the carriers 41 and 42 is pressed outwardly to form lugs 46 which fit in recesses in abrasive honing members 47. The abrasive honing members 47 may be composed of any suitable abrasive material, for example grit of fused alumina, silicon carbide or other hard carbides, emery, corundum, garnet or diamonds bonded with any suitable bond such as natural or synthetic resin, rubber or vitrified clay. Abrasive honing sticks of the shape of the honing members 47 shown in the drawing are suitably formed and then cemented to the carriers 41 and 42. As an example merely of one suitable way of cementing the abrasive sticks in place, a thin layer of soft rubber compound may be used which when vulcanized under a small amount of pressure produces a very secure joint.

On the carriers 41 and 42 I provide seats 50 and a guard 51 which may be soldered in place. On the seats 50 and above the guard 51 I removably mount garter springs 52.

Considering now the operation of the tool, the shank 10 rotates, through the universal joint, the driven member 13, which in turn rotates the shaft 23. The shaft 23 has on it the cams 45 which actute the tappets 43. When the tool is started, therefore, the cams 45 tend to expand the tappets 43 and, therefore, the carriers 41 and 42. The carriers 41 and 42 are driven from the shaft 23 through the key 25, collar 26, pawl 29, ratchet teeth 34, clutch teeth 36, 37, and driving member 38 and driving lug 40. However, the cams 45 start in motion first owing to the lost motion between the lug 40 and the carriers 41 and 42. Therefore, the tendency is upon starting the hone, to tighten it in the bore of a work piece.

Conversely, when the tool is stopped, the tendency is to loosen it in the work piece. This is because of that phenomenon which may be observed in automobiles and railway cars and exists to a certain extent in the case of any driven part on account of Newton's law of action and reaction. When a railway carriage comes to a stop with the brakes set, the cars move backward even if only for a fraction of an inch. An automobile, when the brakes are tightly set, moves back a greater distance. This is because of the strain set up in the parts which is relieved when the force of inertia is overcome. So also in any machine tool, there is a slight retrograde motion amounting to several minutes of arc in the spindle of a driven part against which pressure is exerted when the spindle stops. Such action causes a back-off between the cams 45 and the tappets 43 when the spindle comes to a stop, which back-off loosens the hone in the bore of the work piece. This back-off is permitted by the loose fit of the driving lug 40 in the carriers 41 and 42.

It will be seen that the hone is readily assembled since the carriers 41 and 42 are held together by means of the garter springs 50 which may be quickly removed. When this is done, the carriage can be simply lifted off of the cams 45. This construction greatly facilitates replacement of the abrasive sticks when a given pair thereof are used up. The carriers being made of sheet metal, are not expensive and spare carriers to which are cemented fresh abrasive sticks will be provided and also different sizes of sticks may in that way be utilized.

The carriers 41 and 42 and the hones 47 may be quickly expanded in the bore of a work piece simply by rotating the ring 32. This will rotate only in the direction to expand the hone and retrograde movement is prevented by pawl 29 and ratchet teeth 34. In order to secure retrograde motion if desired at any time, as in the case of a hone sticking in a work piece where the back-off is not great enough, or to reduce the size of the hone to enter a smaller bore, the adjustment ring 32 and collar 26 may be lifted to separate the teeth 36 and 37. I provide a spring 53 between the driving member 13 and the collar 26 normally to hold the clutch teeth 36 and 37 together.

An important feature of the invention is the overlapping or sliding of one carrier 41 and the other carrier 42. Thus the support of these members is achieved using a very small amount of space. The cam that separates the members is relatively small and can be made even smaller than shown in the drawing. So also there is room to reduce the cross sectional area of the tappet 43. By the type of construction shown, a very small amount of space is used in view of the results achieved. Practically every type of hone can be made just so small and no smaller and operate properly. The present hone is susceptible of embodiment in a very small tool. The carriers are pieces of channel steel facing in opposite directions and one fitting or nesting within the other and are held in spaced relation by the cams and tappets and are held together by the garter springs. The entire lower end of the tool can, therefore, be disassembled in a few seconds.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A honing tool comprising a pair of channel shaped carriers, one fitting within the other and facing in opposite directions, means to adjust the carriers inwardly and outwardly, and abrasive sticks cemented to the carriers.

2. A hone comprising a shaft, a pair of cams on the shaft, channel shaped carriers of a size to nest one within the other, tappets in the carriers spaced apart the same distance as the cams and contacting therewith, garter springs holding the carriers together, and abrasive members on the carriers.

3. A hone comprising a shaft, a pair of channel shaped carriers, cams on the shaft fitting inside of the carriers and arranged by relative angular movement to separate the carriers, abrasive sticks carried by the carriers, and garter springs holding the carriers together on the shaft and in operative relation to the cams.

4. A honing device comprising a central shaft, a cam on the central shaft, a driving member apart from the shaft, a pair of channel shaped carriers in nesting relation surrounding the shaft and in position to be driven by the driving member, tappets carried by the carriers engaging the cam, and garter springs surrounding the carriers and holding the aforesaid parts together.

5. A honing tool comprising abrasive sticks, carriers for said abrasive sticks, means to expand the carriers including a shaft and a driving member for the carriers, a collar keyed to the shaft, and a member between the collar and the driving member, a pawl and ratchet connection between the collar and the member, and a clutch between the member and the driving member.

6. In a honing tool, a universal joint, a central shaft fastened to the universal joint, a collar keyed to the shaft, a pawl carried by the collar, a ring below the collar having ratchet teeth for engagement with the pawl, clutch teeth on the lower side of the ring, a driving member below the ring, clutch teeth on the upper side of the driving member for engagement with the aforesaid clutch teeth, a driving lug carried by the driving member, abrasive carriers surrounding the shaft and in position to be engaged by the driving lug, cam means on the carriers and shaft to expand the carriers, and abrasive sticks carried by the carriers.

THEODORE H. NYE.